(No Model.)  W. W. LE SEUR.  2 Sheets—Sheet 1.
DEVICE FOR OPERATING RAILWAY SWITCHES.
No. 440,880.  Patented Nov. 18, 1890.
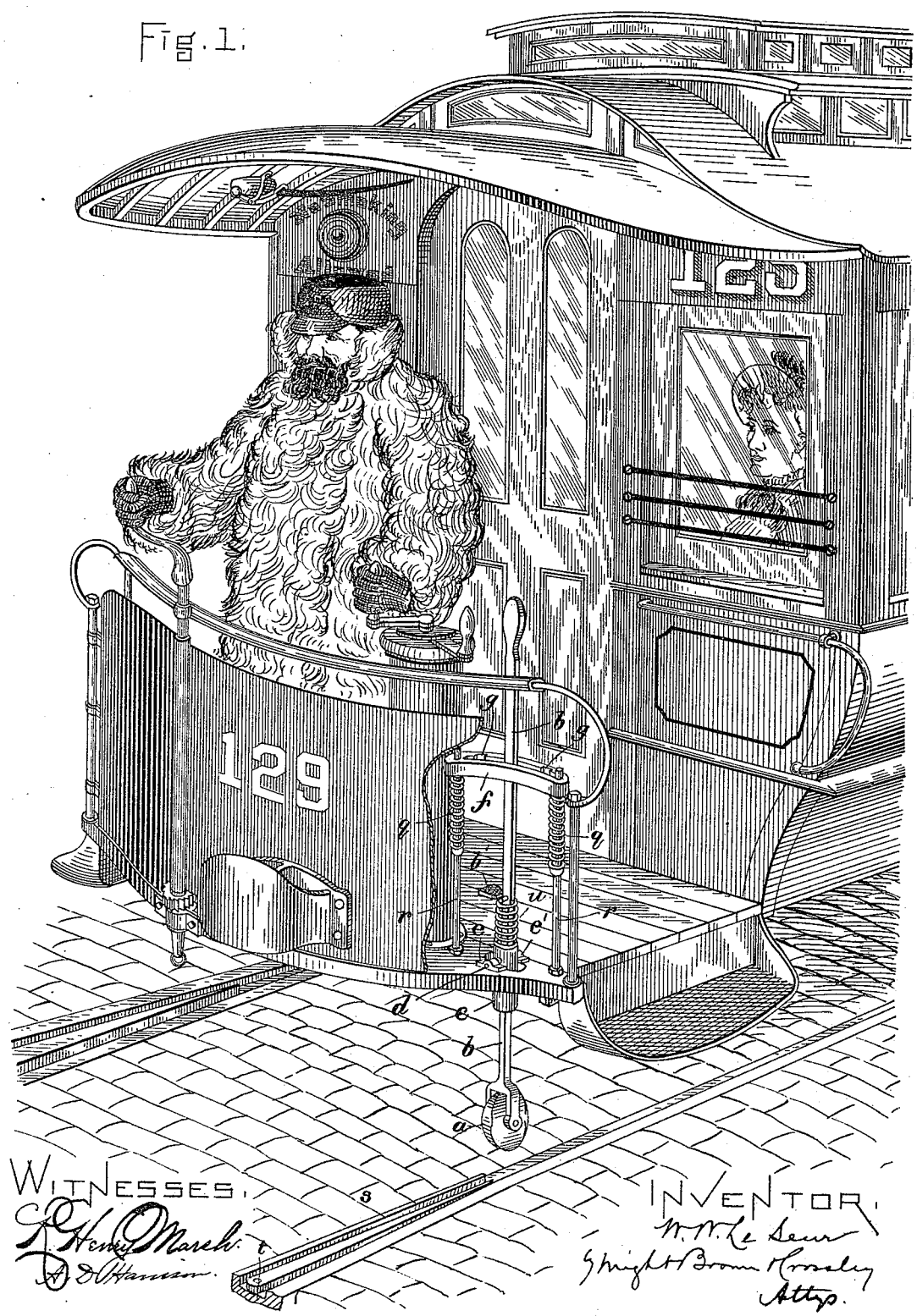

(No Model.) 2 Sheets—Sheet 2.
W. W. LE SEUR.
DEVICE FOR OPERATING RAILWAY SWITCHES.
No. 440,880. Patented Nov. 18, 1890.
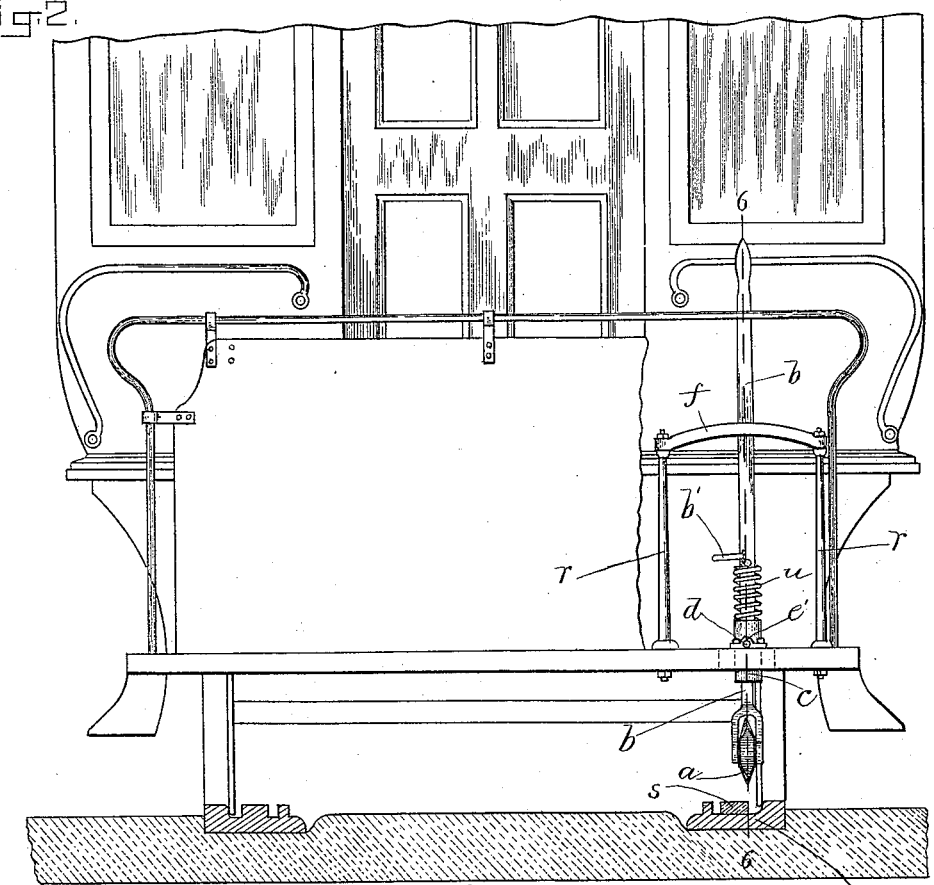
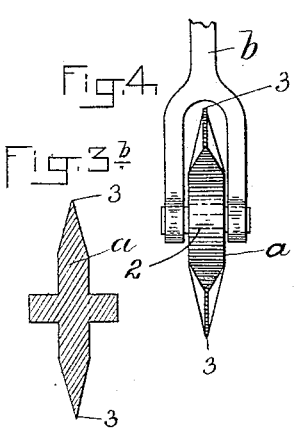
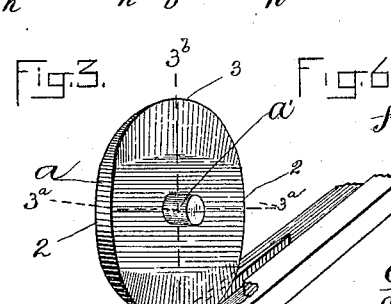
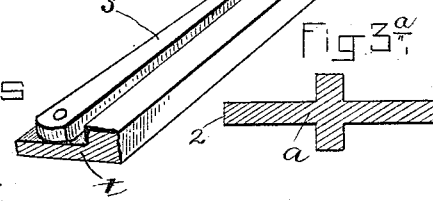
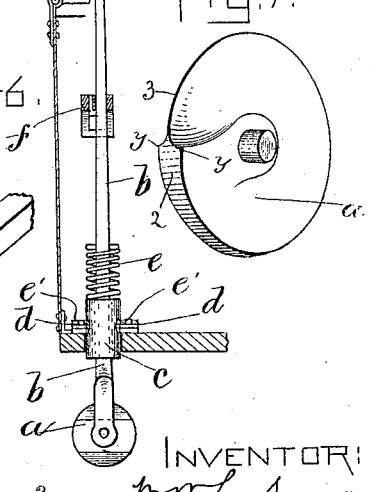
WITNESSES
INVENTOR:
THE NORRIS PETERS CO., PHOTO-LITHO., WASHINGTON, D. C.

UNITED STATES PATENT OFFICE.

WILLIAM W. LE SEUR, OF BOSTON, MASSACHUSETTS.

DEVICE FOR OPERATING RAILWAY-SWITCHES.

SPECIFICATION forming part of Letters Patent No. 440,880, dated November 18, 1890.

Application filed March 15, 1890. Serial No. 344,038. (No model.)

*To all whom it may concern:*

Be it known that I, WILLIAM W. LE SEUR, of Boston, in the county of Suffolk and State of Massachusetts, have invented certain new and useful Improvements in Devices for Operating Railway-Switches, of which the following is a specification.

This invention relates to appliances used on street-cars whereby the driver or other attendant while standing on the car is enabled to operate a switch on the track, and thereby cause the car to go in any direction desired.

The invention consists, first, in a wheel or truck the periphery of which is a circular wedge adapted in rolling along beside a movable switch to turn said switch laterally, combined with appliances connecting said wheel with the platform or other suitable part of the car, said appliances being of such character that the driver or other attendant on the car can place the wheel in position to move a switch on the track as may be desired.

The invention also consists in certain specific improvements relating to the appliances for supporting and moving the wheel, all of which I will now proceed to describe and claim.

Of the accompanying drawings, forming a part of this specification, Figure 1 represents a perspective view of a portion of a street-car provided with my improved switch-operating device, a portion of the fender being broken away to show more clearly the appliances which support the switch-operating wheel, and through which the driver applies said wheel to the desired portion of the track. Fig. 2 represents an end elevation of the car and a cross-section of the track. Fig. 3 represents a perspective view of the switch-operating wheel and the switch on which it operates, the wheel being shown as bearing on the switch and in the act of moving it laterally. Fig. 3ª represents a section on line 3ª 3ª, Fig. 1. Fig. 3ᵇ represents a section on line 3ᵇ 3ᵇ, Fig. 1. Fig. 4 represents an edge view of the wheel and the lower portion of the yoke or bar which supports it. Fig. 5 represents a top view of the device used for retaining the wheel-carrying lever in different positions. Fig. 6 represents a section on the line 6 6, Fig. 2. Fig. 7 represents a perspective view of the wheel, showing certain modifications in the form of its periphery.

The same letters of reference indicate the same parts in all of the figures.

In the drawings, $a$ represents a wheel or truck, which is mounted to rotate in bearings in a vertically-movable holder applied to the platform of a street-railroad car, the holder being adapted to be raised and lowered by the driver to bring the wheel $a$ into contact with one of the track-rails and with the switch $s$, of the usual pattern, forming a part of the track.

The wheel $a$ has its periphery formed as a circular wedge—that is to say, said periphery is thickened, as shown at 2, Figs. 3, 3ª, and 4, and gradually reduced from the thickened portion until it is reduced to a comparatively thin edge 3. There may be one thickened portion 2, as shown in Fig. 7, or more than one, as shown in Figs. 1, 2, 3, 3ª, 3ᵇ, and 4. When the wheel is depressed by the act of the driver, as hereinafter described, its periphery comes in contact with the upper surface of the base of the track-rail $t$, and its inclined or wedge-shaped side is brought into rolling contact with one side of the switch $s$. The wedge shape of the wheel and its rotary motion caused by contact with the rail-base causes said wheel to crowd or force the switch laterally, thus giving it the changed position desired to govern the course of the car. The means for operating the wheel, or, in other words, applying it to the desired portion of the track and for raising it out of its operative position, may be variously modified, and although I have here shown a good and practical way of operating said wheel, I do not desire to be understood as limiting myself to the operating means here shown.

$b$ represents a lever which supports the wheel $a$, and has a yoke formed at its lower end, in the arms of which the wheel $a$ is journaled. Said lever is vertically movable in a sleeve $c$, which is provided with trunnions $d$ $d$, fitted in sockets $e'$ $e'$ on the platform of the car, said sleeve being adapted by said trunnions to oscillate in a plane substantially at right angles with the length of the car. The lever $b$ is therefore enabled to oscillate with the sleeve $c$, so that the driver, by grasping the upper end of said lever and moving it in one direction or the other crosswise of the car, can change the position of the wheel $a$ and cause it to engage any desired portion of the track, so that if the switch is to be turned in one direction the wheel may be moved to position to bear upon one side of the switch, and if the switch is to be moved in the opposite direction the wheel is brought to a position which enables it to bear on the opposite side of the switch.

To hold the wheel $a$ in different definite positions, I provide a bar $f$, extending crosswise of the car, and form in said bar a series of notches $g$, each adapted to receive the lever $b$ and prevent lateral movement thereof, and a corresponding series of springs $h$, arranged opposite the notches $g$, and adapted to press the lever $b$ into said notches, as shown in Fig. 5.

When it is desired to hold the wheel $a$ in position to bear on one side of the switch, the lever $b$ is engaged with one of the notches $g$, and when it is desired to hold the wheel in another position, so that it will produce a different result, the lever $b$ is engaged with another notch $g$. There may be as many notches as there are to be operative positions of the wheel $a$, each notch being located to perform a given function.

The lever $b$ is vertically movable in the sleeve $c$, and is provided with a foot-piece or treadle $b'$, whereby the operator may depress the lever and the wheel. A spring $u$, interposed between the sleeve $c$ and a suitable projection on the lever $b$, raises the lever and the wheel $a$ when pressure is removed from the pedal $b'$.

It will be seen that the operator by first setting the lever $b$, or, in other words, engaging it with the desired notch $g$ before the car reaches the place where the switch is located, has only to depress the lever $b$ just before reaching the switch to enable the wheel $a$ to give the switch the desired movement, so that there is little or no liability of the failure of the wheel to act as desired, nothing being left to the judgment of the operator excepting the selection of the time for depressing the wheel.

In Fig. 7 I have shown the wheel with its sides beveled and cut away to leave shoulders $y\ y$ at the widest portion of the periphery, the latter being gradually narrowed from said shoulders to the thinnest part of the periphery which joins said shoulders.

The notched bar $f$ is shown in Fig. 1 as mounted on springs $q\ q$, supported by collars on fixed guide-rods $r\ r$, the bar being thereby permitted to rise and fall with the rod or lever $b$. Said springs may be dispensed with, however, as shown in Fig. 2.

I claim—

1. A switch-operating wheel having a wedge-shaped periphery combined with operating devices whereby said wheel is connected with and adapted to be operated from a car, as set forth.

2. The combination of a sleeve pivotally secured to a car-platform and adapted to oscillate crosswise thereof, a lever passing through said sleeve and vertically movable therein, a switch-operating wheel having a wedge-shaped periphery carried by said lever, and means, substantially as described, for locking or holding said lever and wheel in different positions, whereby the wheel may be set for action on any desired part of the track, as set forth.

3. The combination of a sleeve pivotally connected to the platform of a car and adapted to oscillate crosswise thereof, a lever vertically movable in said sleeve and adapted to oscillate therewith, a switch-operating wheel having a wedge-shaped periphery journaled in the lower end of said lever, and a notched bar or holder secured to the car and adapted to secure said lever and wheel in different lateral positions, as set forth.

In testimony whereof I have signed my name to this specification, in the presence of two subscribing witnesses, this 7th day of March, A. D. 1890.

WILLIAM W. LE SEUR.

Witnesses:
A. D. HARRISON,
ARTHUR W. CROSSLEY.